United States Patent [19]

Yu

[11] Patent Number: 4,763,036
[45] Date of Patent: Aug. 9, 1988

[54] COMMUTATOR FOR A D. C. MOTOR

[75] Inventor: Kwong-Kwan Yu, Stanley, Hong Kong

[73] Assignee: Johnson Electric Industrial Manufactory, Limited, Chaiwan, Hong Kong

[21] Appl. No.: 5,838

[22] Filed: Jan. 21, 1987

[30] Foreign Application Priority Data

Jan. 22, 1986 [GB] United Kingdom ............... 8601459

[51] Int. Cl.$^4$ ............................................. H02K 13/10
[52] U.S. Cl. .................................... 310/233; 310/219; 310/236
[58] Field of Search ............... 310/219, 233, 232, 228, 310/236, 234, 235, 237, 239, 40 MM, 46, 177, 154, 89, 90, 248

[56] References Cited

U.S. PATENT DOCUMENTS

| | | | |
|---|---|---|---|
| 388,513 | 8/1888 | Van Gestel | 310/219 |
| 1,568,682 | 1/1926 | Marcellus | 310/219 |
| 3,984,164 | 10/1976 | Schreffler | 310/219 X |
| 4,500,804 | 2/1985 | Akiyama | 310/219 X |

FOREIGN PATENT DOCUMENTS 1580294 12/1980 United Kingdom .
2095919 4/1982 United Kingdom .

Primary Examiner—R. Skudy
Attorney, Agent, or Firm—Fleit, Jacobson, Cohn & Price

[57] ABSTRACT

A cylindrical outer surface of a commutator is formed with circumferencially extending striations separated by sharp-edged ridges which bite into the abutting surfaces of the brushes engaging the commutator to improve electrical conductivity and reduce static mechanical friction. These striations and the ridges may extend helically so that, on relative movement between the commutator and the brushes, the abutting surfaces of the brushes are scoured. There is also a tendency for the brushes to be moved axially of the commutator, against the restoring force provided by the brush leaf, until this restoring force rises sufficiently to cause the brush to return towards its original axial position so that the surfaces of the brushes and the commutator scrape against each other so as to present fresh surfaces for abutment.

10 Claims, 2 Drawing Sheets

COMMUTATOR FOR A D. C. MOTOR

FIELD OF THE INVENTION

The invention relates to a commutator for a d.c. motor and, in particular, although not exclusively, to a commutator for a d.c. micromotor.

BACKGROUND ART

Commutators of known d.c. motors comprise at least three segments arranged to provide a substantially cylindrical outer surface and, according to conventional practice, this outer surface is made with a small value of roughness so as to avoid excessive frictional resistance to relative movement between the commutator and the brushes.

Regardless of the adequacy of this surface finish for most motor applications, it becomes inadequate under circumstances where the motor is fed with low voltages, has a small developed torque and has a starting torque specified for every angular position of rest.

A brush for low voltage applications must of necessity contain a large metallic porportion. This is usually a noble metal to avoid excessive oxidation. Silver is commonly used.

The brush to commutator interface influences shaft output starting torque in two ways.

Firstly, a resistance to mechanical motion, sometimes called stiction, is formed as a mechanical bond between the two components and requires fracturing before a sliding action can begin. The torque required to make this fracture is deducted from the torque developed by the armature, thus lessening the output torque to the shaft. The strength of the bond is a function of the area of surface contact, the type of metal in each component and the surface finish of the two components.

If silver from the brush is transferred to the commutator and some electrical polishing of this surface occurs due to electrical arcing, the result is two smooth surfaces of like metals in which atomic bonding readily takes place causing high values of stiction.

The second way in which the interface influences starting torque is concerned with the electrical resistance provided at the interface. If the interface surfaces are too smooth then the current densities in the large number of asperites in contact is too low to effectively burn away oxide films. The result is an increase in static resistance and an equivalent reduction in current and starting torque. Such an interface develops when silver is transferred to the commutator and electrically polished.

DISCLOSURE OF THE INVENTION

It is the purpose of the present invention to provide a commutator in which the disadvantages of known commutators are at least reduced. It is therefore an object of the present invention to provide a commutator for an electric motor in which the mechanical and electrical resistances between the commutator and the brushes supplying current to the commutator are reduced.

This is achieved by forming circumferentially extending striations on the cylindrical outer surface of the commutator.

Thus, according to the invention, there is provided a commutator, for a d.c. motor, in which at least three commutator segments are arranged to provide a substantially cylindrical outer surface and circumferentially extending striations are formed in said outer surface.

These striations are separated by ridges which bite into the abutting surfaces of the brushes and thereby reduce the electrical resistance between the brushes and the commutator.

Furthermore, resulting from the interaction between the ridge formation on the cylindrical outer surface of the commutator and the abutting surfaces of the brushes, the contact area between the brushes and commutator surface is reduced. Therefore when comparing the ridged commutator surface with a conventional, smooth commutator surface, for the same amount of current flowing across the interface, the current density will be larger. This increases the extent to which electrically resistant oxide film formed on the two interfacing surfaces is burnt away and, as a result, the electrical contact resistance between the brushes and the commutator is reduced.

The developed output torque at the shaft will therefore be improved as the current flowing from the brushes to the commutator is increased because of the reduction of electrical contact resistance.

The ridge formation of the cylindrical outer surface of the commutator also reduces the contact area between the brushes and the commutator surface and so the mechanical resistance to sliding motion between the brushes and the commutator will be reduced. As a result, the developed output torque at the shaft will be improved as the torque required to fracture the striction bond before sliding action can begin is reduced.

The striations should be between 0.02 mm and 0.06 mm deep, number between 33 and 100 per cm along the axial length of the commutator, and form sharp edged ridges, between adjacent striations.

These striations may lie in planes perpendicular to the axis of the commutator and form grooves which extend along endless circular axes around the surface of the commutator. However, in a preferred embodiment of the invention, the striations extend helically around the outer surface of the commutator.

In the said preferred embodiment of the invention, relative movement between the commutator and the brushes causes the abutting surfaces of the brushes to be scoured. There is also a tendency for each brush to be moved axially of the commutator, against the restoring force provided by the brush leaf supporting the brush until this restoring force rises sufficiently to cause the brush to return towards its original axial position so that the surfaces of the brushes and the commutator scrape against each other so as to present fresh surfaces for abutment.

As a result, excessive oxidation on the abutting surfaces of the brushes is removed. This may obviate the use of a noble metal, such as silver, to increase the metallic proportion of brushes for low voltage motors. Furthermore, in the absence of high silver content in the brushes, the electrical silver polishing of the commutator segment surfaces resulting from electrical arcing and the subsequent problem of high striction strength caused by atomic bonding between two smooth surfaces of like metals may also be avoided.

A commutator according to the invention is hereinafter described, by way of example, with reference to the accompanying drawings.

MODE FOR CARRYING OUT THE INVENTION

Figure 1:
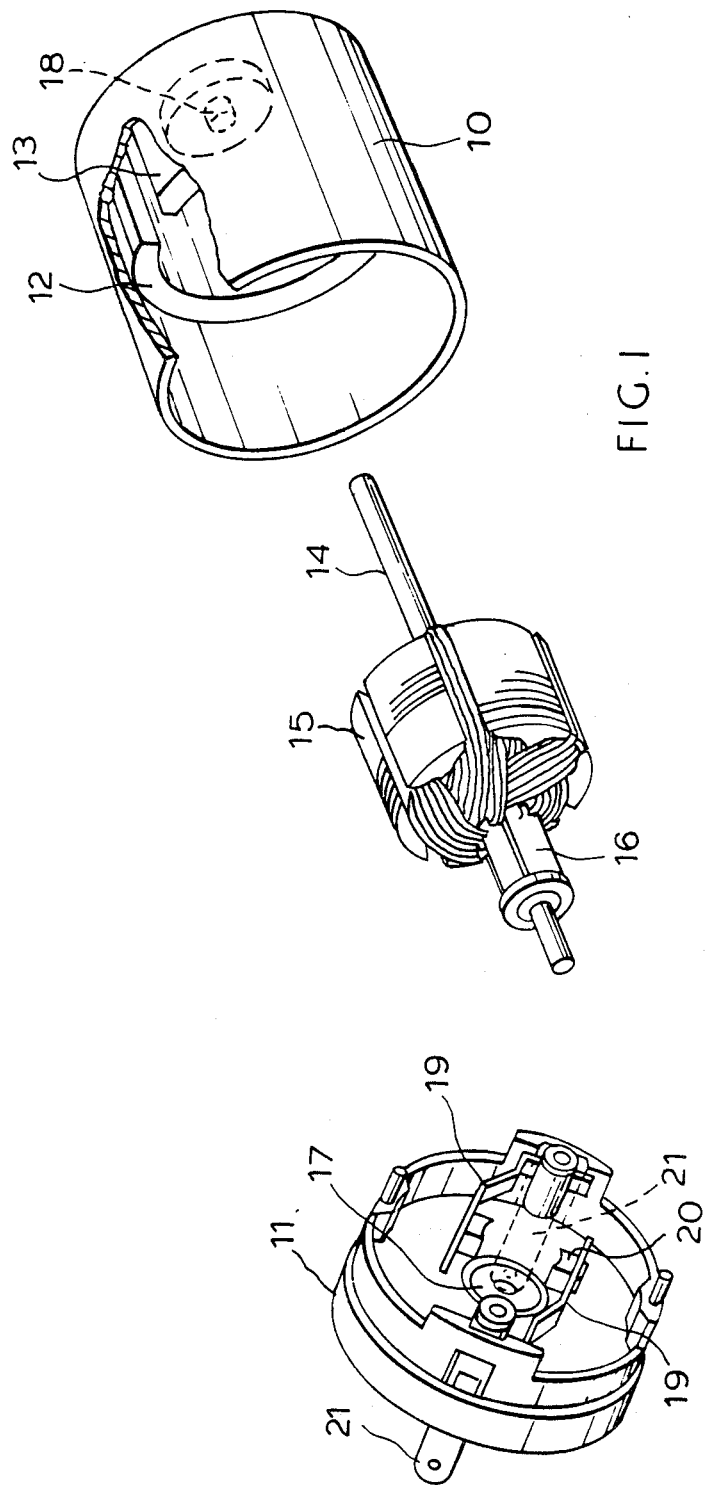
FIG. 1 is an exploded view of an electric motor incorporating a commutator which may embody the present invention.

Referring to FIG. 1, the motor shown therein is a small, fractional horsepower permanent magnet direct current motor, which comprises a cylindrical steel can-like casing 10 closed at one end and a plastics end cap 11, typically of nylon, which is fitted into the other end of the casing 10. Two ceramic stator magnets 12 and 13 are fixed within the casing 10 and a shaft 14 carries a wound armature 15 and a commutator 16. The armature 15 and commutator 16 are mounted fast on the shaft 14 and the armature 15 is wound and connected to the commutator 16 in a manner generally known in the art.

When the motor is assembled, the shaft 14 is supported for rotation within the casing 10 and between the stator magnets 12 and 13 by self-aligning bearings 17 and 18 mounted, respectively, in the end cap 11 and in the closed end of the casing 10.

Brush gear for the motor is carried by the end cap 11. The brush gear comprises brush holders 19 in the form of elongate resilient metal plates each supporting a brush 20. Motor terminals 21 are secured to respective brush holders 19 and project through terminal apertures in the end cap 11.

Figure 2:
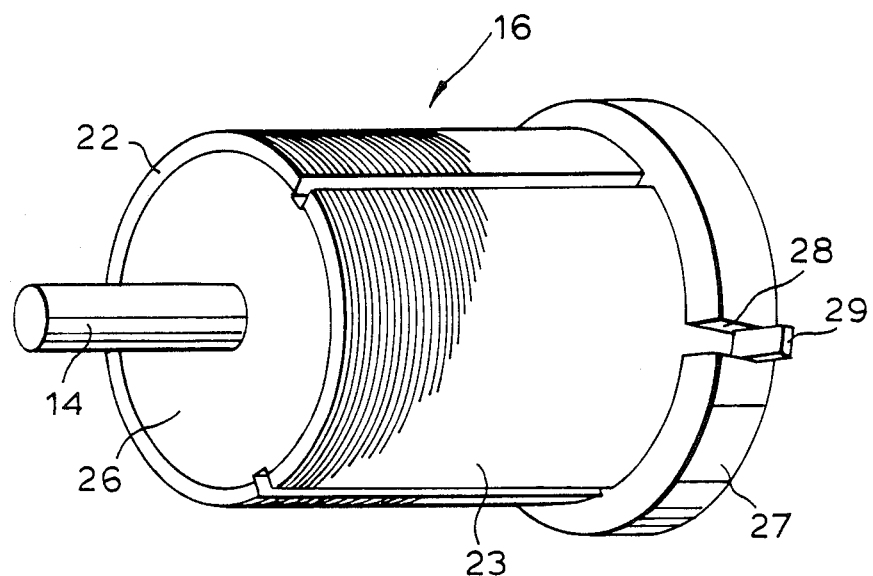
FIG. 2 is an isometric view of one embodiment of commutator according to the present invention.

As shown in FIG. 2, three commutator segments 22 are mounted on an insulating cylindrical segment holder 26 which, in turn, is mounted on shaft 14 to form a composite commutator having a cylindrical outer surface 23.

The commutator segments 22 are held in place on the segment holder 26 by means of an annular ring 27 formed with radial slots 28 through which segment terminals 29 extend.

Figure 3:
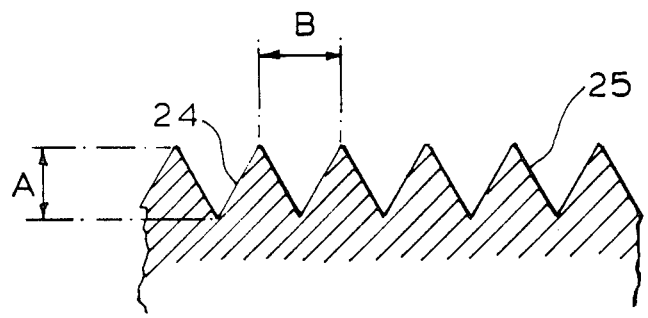
FIG. 3 is an axial cross-sectional view of part of the outer surface of the commutator shown in FIG. 2.

Striations 24 are cut into the outer surface 23 to form sharp-edged ridges 25 between each pair of adjacent striations, as shown in FIG. 3. In operation, these sharp-edged ridges bite into abutting brush surfaces to thereby increase electrical conductivity between the brushes and the commutator, as required.

In the striations 24 shown in FIG. 3, the depth A of each striation is 0.02 mm, the width B of each striation 24 is 0.12 mm so that there are about 80 striations per cm of axial length of the commutator. The striations 24 are preferably formed as multi-start grooves which extend helically around the outer surface of the commutator and which have a lead of 0.1 mm to 0.3 mm; they could however lie in planes perpendicular to the axis of the commutator and form grooves which exend along endless circular axes around the outer surfaces of the commutator.

The above embodiment is given by way of example only and various modifications will be apparent to persons skilled in the art without departing from the scope of the invention defined by the appended claims.

I claim:

1. A commutator for a d.c. motor, comprising at least three commutator segments arranged to provide a substantially cylindrical outer surface wherein circumferentially extending striations between 0.02 mm and 0.06 mm deep are formed in said outer surface, the striations being separated by sharp edged ridges for biting into abutting surfaces of brushes in the motor.

2. A commutator according to claim 1, in which the striations number between 33 and 100 per cm along the axial length of the commutator.

3. A commutator according to claim 2, in which the striations are 0.02 mm deep and 0.12 mm apart along the axial length of the commutator.

4. A commutator according to claim 1 in which the striations lie in planes perpendicular to the axis of the commutator and form grooves which extend along endless circular axes around the outer surface of the commutator.

5. A commutator according to claim 1, in which the striations extend around the outer surface of the commutator along at least one helical axis.

6. A commutator according to claim 5, in which the striations are formed as multi-start grooves and have a lead of 0.1 mm to 0.3 mm.

7. A fractional horsepower permanent magnet direct current motor comprising a casing generally closed at one end, an end cap fitted to the other end of the casing, bearings mounted in the end cap and the closed end of the casing, at least one stator magnet fixed within the casing, a shaft mounted for rotation in the bearings, an armature and a commutator mounted fast on the shaft, and brush gear carried by the end cap, the brush gear including commutator-engaging brushes, the commutator having at least three commutator segments arranged to provide a substantially cylindrical outer surface, wherein circumferentially extending striations between 0.02 mm and 0.06 mm deep are formed in said outer surface with sharp edged ridges between the striations which bite into abutting surfaces of the brushes.

8. A motor according to claim 7, wherein the striations number between 33 and 100 per cm along the axial length of the commutator.

9. In a d.c. electric motor including commutator segments defining a substantially cylindrical outer surface and brushes engaging said outer surface, the improvement comprising circumferentially extending striations between 0.02 mm and 0.06 mm deep in the outer surface of the commutator with sharp edged ridges between the striations, which ridges bite into engaging surfaces of the brushes.

10. A motor according to claim 9 wherein the striations number betwen 33 and 100 per cm along the axial length of the commutator.

* * * * *